(12) United States Patent
Myers et al.

(10) Patent No.: US 8,418,574 B2
(45) Date of Patent: Apr. 16, 2013

(54) LINEAR ACTUATOR

(75) Inventors: Timothy Mark Stephen Myers, Newcastle Upon Tyne (GB); Francis Russell Watson, Derby (GB)

(73) Assignee: Rolls-Royce PLC (GB)

( * ) Notice: Subject to any disclaimer, the term of this patent is extended or adjusted under 35 U.S.C. 154(b) by 804 days.

(21) Appl. No.: 12/016,373

(22) Filed: Jan. 18, 2008

(65) Prior Publication Data

US 2008/0190227 A1    Aug. 14, 2008

(30) Foreign Application Priority Data

Feb. 14, 2007  (GB) .................................. 0702791.5

(51) Int. Cl.
*F16H 27/02*    (2006.01)
(52) U.S. Cl.
USPC ........................................................ 74/89.37
(58) Field of Classification Search ............... 74/22 R,
74/89, 89.37, 89.39, 424.71, 427; 411/432,
411/433; 114/154; 440/12.52, 12.57, 59
See application file for complete search history.

(56) References Cited

U.S. PATENT DOCUMENTS

| | | | | |
|---|---|---|---|---|
| 2,144,447 A | * | 1/1939 | Barnhart | 74/89.23 |
| 3,363,434 A | * | 1/1968 | Kuhn et al. | 464/170 |
| 5,037,145 A | * | 8/1991 | Wilkes | 292/201 |
| 5,125,858 A | * | 6/1992 | Salvetti | 440/54 |
| 5,522,335 A | | 6/1996 | Veronesi et al. | |

FOREIGN PATENT DOCUMENTS

GB    2248566 A    4/1992

* cited by examiner

*Primary Examiner* — Vicky Johnson
(74) *Attorney, Agent, or Firm* — McCormick, Paulding & Huber LLP

(57) ABSTRACT

A combined linear and rotary actuator has a shaft with a screw thread, a nut engaging the screw thread and engaging means movable between a first location where rotation of the turning mechanism produces substantially linear displacement of the shaft, and a second location where rotation of the turning mechanism produces substantially rotary displacement of the shaft. The linear actuator finds particular use on retractable marine propulsor such as used on submarines and the like.

25 Claims, 3 Drawing Sheets

LINEAR ACTUATOR

CROSS-REFERENCE TO RELATED APPLICATION

This application is entitled to the benefit of British Patent Application No. GB 0702791.5 filed on Feb. 14, 2007.

FIELD OF THE INVENTION

The present invention relates to linear actuators that convert rotary motion into either linear or rotary motion. The invention finds particular application in the field of retractable units for marine applications.

BACKGROUND OF THE INVENTION

Retractable thrusters are known for marine applications. Conventional retractable thrusters either drop-down vertically or pivot downwards around a hinge. Vertically retractable units have one set of hydraulic rams for lifting/lowering the thrusters and another mechanism for turning the thrusters to their desired orientation. The turning mechanism can be one or more hydraulic rams operating via a lever system to give rotary motion over a limited angle, or a geared motor (electric or hydraulic) acting on a large diameter steering gear via small diameter pinions (either singly or in groups spaced around the steering gear wheel). Such arrangements are complex and require both axial and rotary actuators with their concomitant control systems, cabling and hull penetrations.

SUMMARY OF THE INVENTION

It is an object of the present invention to seek to provide an improved linear actuator. It is a further object of the invention to seek to provide improved retractable thrusters.

According to the present invention, there is provided a linear actuator having: a shaft having a thread, a rotatable turning mechanism engaging the thread, engaging means movable between a first location where rotation of the turning mechanism produces substantially linear displacement of the shaft, and a second location where rotation of the turning mechanism produces substantially rotary displacement of the shaft.

Preferably, the engaging means include a pin or roller mounted to the shaft.

Preferably, the engaging means includes a sleeve extending around the shaft and having a slot that extends parallel with the shaft.

In the first position, preferably, the pin engages the slot and preferably in the second position the pin does not engage the slot.

Preferably, the sleeve is provided with a limit stop outside the slot against which, when the pin abuts against the limit stop, prevents rotary displacement of the shaft in a first direction and permits rotary displacement of the shaft in the opposite direction.

The rotatable turning mechanism may be connected to the sleeve through a thrust bearing.

Preferably, the rotatable turning mechanism comprises a nut rotatable by a motor.

Preferably, the nut forms at least part of a rotor in a rim driven motor.

Preferably, the nut has a plurality of circumferentially arranged magnets.

The shaft may further comprises a travel limiter which limits the maximum linear displacement of the shaft.

Preferably, propulsion means are mounted to the shaft.

The propulsion means may be a rim driven azimuthing thruster.

DETAILED DESCRIPTION OF THE PREFERRED EMBODIMENTS

Figure 1:
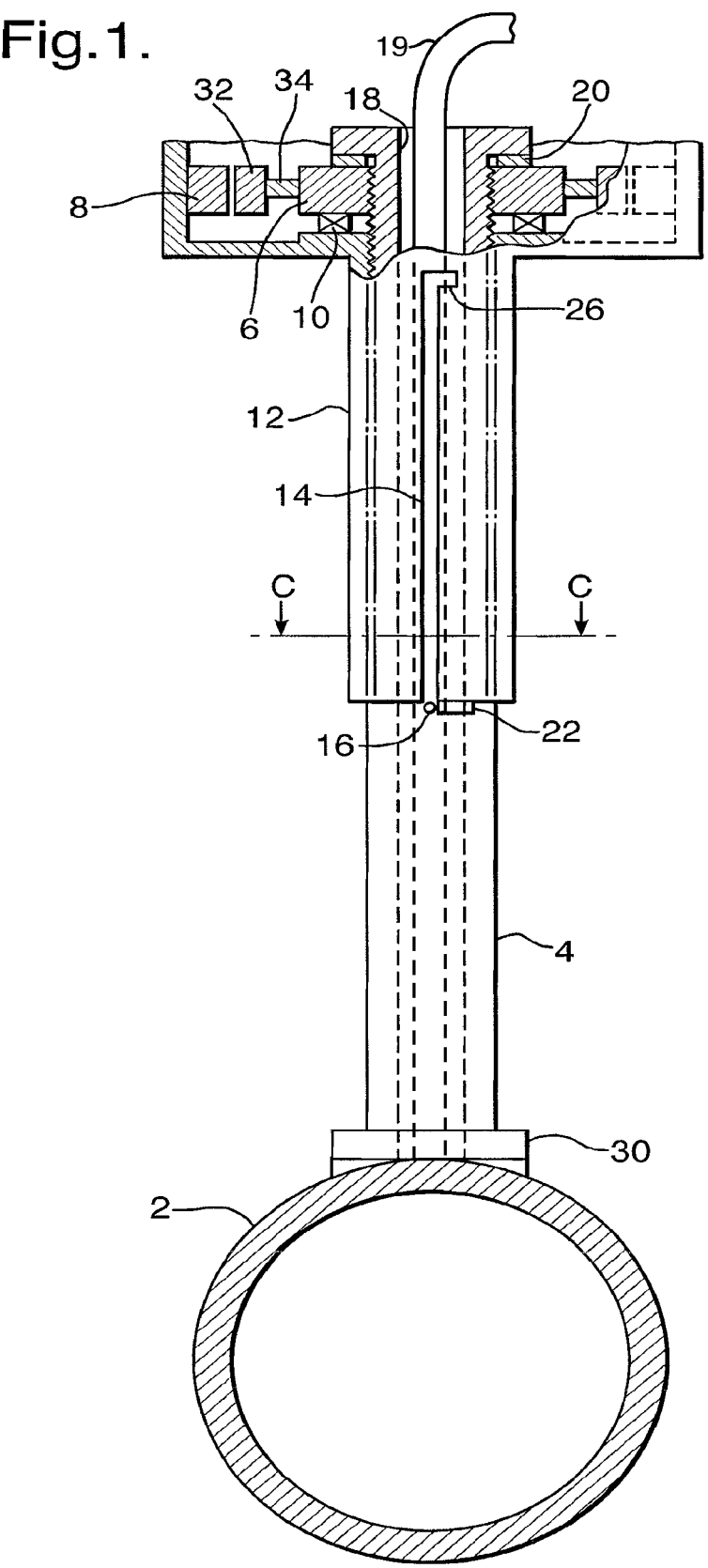
FIG. 1 depicts a linear actuator in accordance with the invention.

FIG. 1 depicts a linear actuator 1 in accordance with the invention and in particular the use of the linear actuator to mount a thruster.

The thruster in this embodiment is a rim driven propulsion pod though any other appropriate form of propulsor may be used.

The thruster is located on a marine vessel, typically a submarine, and can alternate between a deployed position and a stowed position. The thruster is contained within a protective case in its stowed position and when required is moved outside the case to its deployed position. The casing may be flooded with seawater before deployment, or may be permanently open to seawater.

When the thruster is in its deployed position it can be rotated to provide thrust vectoring. The thruster must have a raise and lower function with an additional ability to train the thruster propulsive element by rotation about a vertical axis in order to achieve a steering action. In the invention, both functions may be achieved by a single actuator, which obviates the need for separate actuators controlling both the linear and rotational movement.

Propulsor 2 is mounted onto a shaft 4. For clarity, the propulsor rim alone is shown, and this will encase a propeller, which is not shown.

Shaft 4 has an external screw thread and the description below assumes a reverse or 'left hand' thread on nut 6 and shaft 4. A conventional 'right hand' thread could also be used which would reverse the rotational direction of the actuator to achieve the same end results.

The shaft may be hollow to carry power cables 19 to the propulsor motor. These cables need to withstand a twist over the cable length of up to 270° and preferably up to 360°. The electrical connection to the propulsor motor is made via integral sealed connectors built into flange 30 and the propulsor housing 2. Beneficially, the propulsor is de-mountable by removing the bolts at flange 30 and with use of the appropriate type of connector, could be accomplished while underwater.

The nut 6, which operates on the externally threaded shaft, is rotatable by a motor 8. The nut 6 is held captive by the action of the weight of the shaft 4 and the load it carries which is reacted by the nut 6 via a thrust bearing 10 which in turn operates against a single or multipart fixed load bearing structure 12 which transmits loads to the wider ship structure.

Motor 8 is also mounted to structure 12 either integrally, or as an additional bolt-on component. In the preferred embodiment, the training and raise lower motor 8 is of rim driven construction and comprises a rotor, the centre of which forms the nut 6 on the thread of strut 4. The nut 6 is connected to the magnet carrying rim of the rotor 32 by spokes 34, but depending on the torque required, the magnets could be mounted directly on the nut 6.

The structure 12 has a sleeve portion that extends downwards over the threaded portion of shaft 4. The main radial bearing for the motor is provided by the interaction of shaft 4 and the inner bore of the sleeve. Accordingly, for this embodiment, the form of the thread is chosen such that the outer periphery of the thread forms a reasonable radial bearing surface when it operates in conjunction with the sleeve with which it has a close sliding fit. For an application, where only occasional operation is envisaged, this simple bearing arrangement is satisfactory. For applications requiring more regular deployment a more robust bearing system may be required.

The extension sleeve of structure 12 incorporates a slot 14 in which operates a pin or roller 16 which is solidly mounted to the shaft 4. The pin is a simple structure to manufacture. The roller, which rotates about the axis of the pin, offers an improved life to the pin. In this description, it will be appreciated that it is a matter of choice which of the components is used. Rotation of the shaft is prevented whilst a portion of the pin lies within the slot, but rotation of the shaft is enabled where the pin 16 is free of the slot 14. Whilst rotation is prevented, i.e. the pin lies within the slot, rotation of nut 6 results in linear or axial movement of the shaft to raise or lower it relative to the fixed structure 12.

The slot is open at the lower end of the sleeve and the shaft is designed to permit a linear movement that is sufficient to move the pin 16 out of the slot 14. Once the pin has moved out of the slot, friction between the nut and the shaft means that further rotation of the nut 6 results in simultaneous rotation of both the nut and the shaft.

A flange 18 is provided at the opposing end of the shaft to that of the propulsor and is positioned to reach the nut 6 as the pin 16 exits the slot 14. The flange therefore prevents further downward travel of the shaft and increases the friction between the nut and the shaft. A rubber 'buffer' 20, which is a ring, can be provided between the bottom of the flange 18 and top of nut 6 to help to prevent binding or locking together of the nut 6 and flange 18. The buffer 20 also provides a degree of shock absorbance and prevents over tightening of the nut on the thread. In an alternative embodiment, the buffer may be a low friction ring of low compression material. Whilst this embodiment will not provide a shock absorbance functionality, the low friction material ensures binding between the flange and nut is avoided.

Since further rotation of the nut 6 rotates the shaft 4, any device 2 attached thereto is similarly rotated. Where the device is a propulsor, the maximum required rotation is 360° to give full directional movement. Where the propulsor can work in both forward and reverse, the maximum required rotation is 180° to give full directional movement.

The angular position of the shaft 4 is controlled by the motor drive system, perhaps by the addition of a rotary encoder but more preferably by counting the electrical cycles applied to the synchronous or stepper motor including those items identified as 6, 8, 32, 34 of FIG. 1.

Figure 2A:
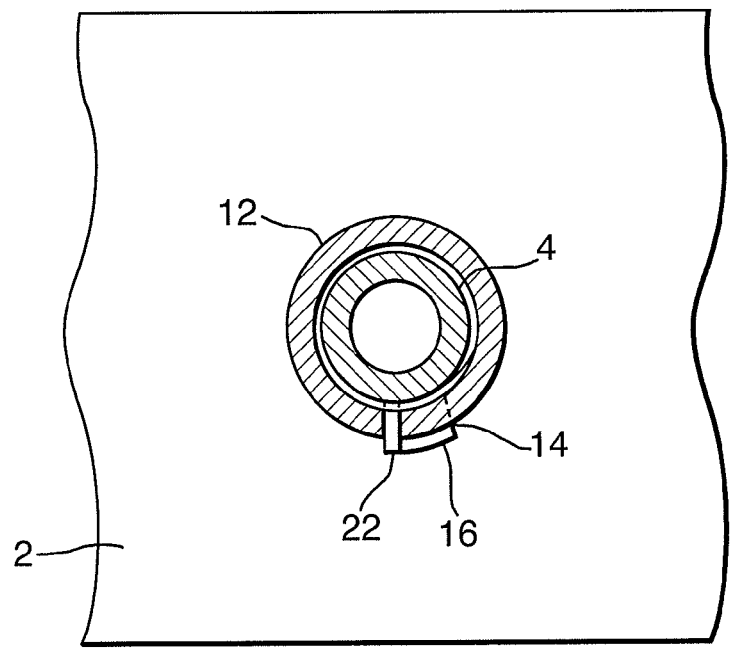
FIG. 2a is a cross-sectional view of the linear actuator of FIG. 1 taken across line C-C.
Figure 2B:
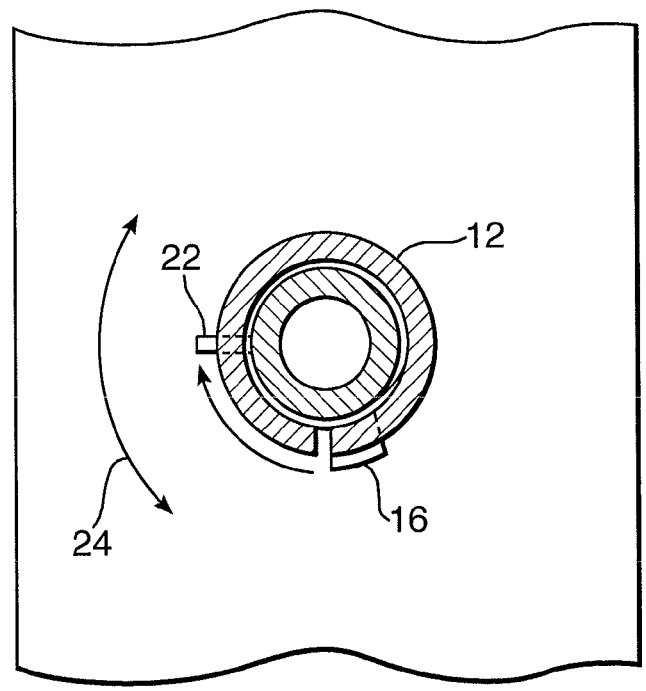
FIG. 2b is a similar view to that of FIG. 2a with the propulsor rotated through 90°.

Complete rotation to bring the pin 16 back into alignment with the slot 14 is prevented by a raised limit stop 22 on the lower surface of the sleeve. FIG. 2a is a top view of the propulsor 2 in position as it is moved in a linear direction. The pin 16 is engaged by the slot 14 and is prevented from rotating. In FIG. 2b, the pin has moved below the slot opening and is consequently able to rotate. During normal operation the shaft is rotated till it is away from the limit stop 22, which enables the propulsor to have a wide swing angle 24 permitting thrust vectoring in nearly all horizontal directions.

In preferred operation, the propulsor would be rotated 180° clockwise (when viewed from the top) so that pin 16 would be on the other side of the unit from that of the slot and limit stop. This is the neutral position with training or steering swing angle of plus or minus about 90° from that position. With the shaft 4 lowered and with the pin rotated away from slot 14 in the sleeve any operation of the training motor will result in rotation of the nut 6 and shaft 4 together, giving the training or steering action, within the plus or minus 90° range specified above. Clockwise rotation will tend to tighten the threaded shaft 4 against the nut 6 via the ring 20 and counter clockwise operation which would tend to loosen that union will be resisted by the friction in the nut as it will be easier to rotate the whole assembly than to lift the strut. Raising the shaft is also prevented by the action of pin against the lower surface of sleeve 12.

Therefore, during normal operations the shaft will rotate a maximum of 270° and the limit stop 22 will not be reached by pin 16. However, should the limit stop be reached the actuator or motor could incorporate a fail-safe cut-out device to turn itself off. Alternatively or additionally, the limit stop can provide a mechanical reference to allow the rotational position keeping system to be reset to 'zero' if position information is lost for any reason. This latter function could be enhanced by also rotating the shaft 4 until the pin 16 contacts the limit stop 22 from one and then the other side.

In order to retract the shaft 4, the shaft is rotated so as to bring the pin 16 to a position where it abuts the limit stop 22 and is in line with the slot 14 at the bottom of the sleeve. The limit stop 22 prevents further rotation of shaft 4 with the motor overcoming the thread friction between nut 6 and shaft 4 to start to lift shaft 4. As the shaft is lifted, the pin runs up slot 14, which continues to prevent rotation of shaft. Slot 14 may be right through the wall of the sleeve as shown for clarity, or may be machined only part way through the wall to confer additional strength to the housing. When the strut reaches its uppermost position, the slot 14 comes to an end and prevents further lifting, so continued counter clockwise rotation of the training motor will move the pin into a detent 26. Detent 26 is a horizontal extension of the slot which provides a security feature which prevents lowering of the shaft in back-up to the nut 6, which continues to be the main support for the weight of shaft 4 and any attachments thereon. The detent 26 can incorporate a limit switch to turn off the motor and/or confirm that the strut is in the raised position.

Software in the motor converter can be used to slow the training motor as it approaches the detent. The software can sense the change in current requirements as the lift operation starts and can then increase motor speed to get an appropriate lifting cycle time. As the motor is synchronous, the converter can count the AC cycles applied to get a good approximation of the vertical position of the unit, and start to slow the motor as the top of slot 14 is approached. The final 'stop' signal would be provided by a sensor in detent 26 or by sensing the rise in current required by the motor as the pin moves against the limit of the detent 26. With the unit raised, the training motor can be de-energised and the weight of the unit will continue to be carried by the nut 6 as the thread pitch would be chosen such as to prevent reverse running, and the detent 26 would provide back-up support via pin 16. If additional security is required, a hole through the wall in the region of detent 26 could be provided (if the slot does not cut right through the wall). Pin 16 may be spring loaded so that it comes through the hole making any further movement of shaft 4 impossible. When the unit is to be lowered, a solenoid-actuated pushpin could push the pin 16 back into the hole to allow movement when lowering is activated, but this would require additional hull penetrations, etc. for electrical connection.

To deploy the propulsor, the motor first rotates nut and the friction loads between the nut and the shaft cause simultaneous movement of the shaft with the nut. The movement of the shaft moves the pin 16 out of detent 26 and into slot 14. The pin is secured in the slot and further rotation of the nut causes the shaft 4 to be lowered until the pin 16 exits the slot 14 after which the whole of shaft 4 is free to rotate to the desired steering angle.

Figure 3:
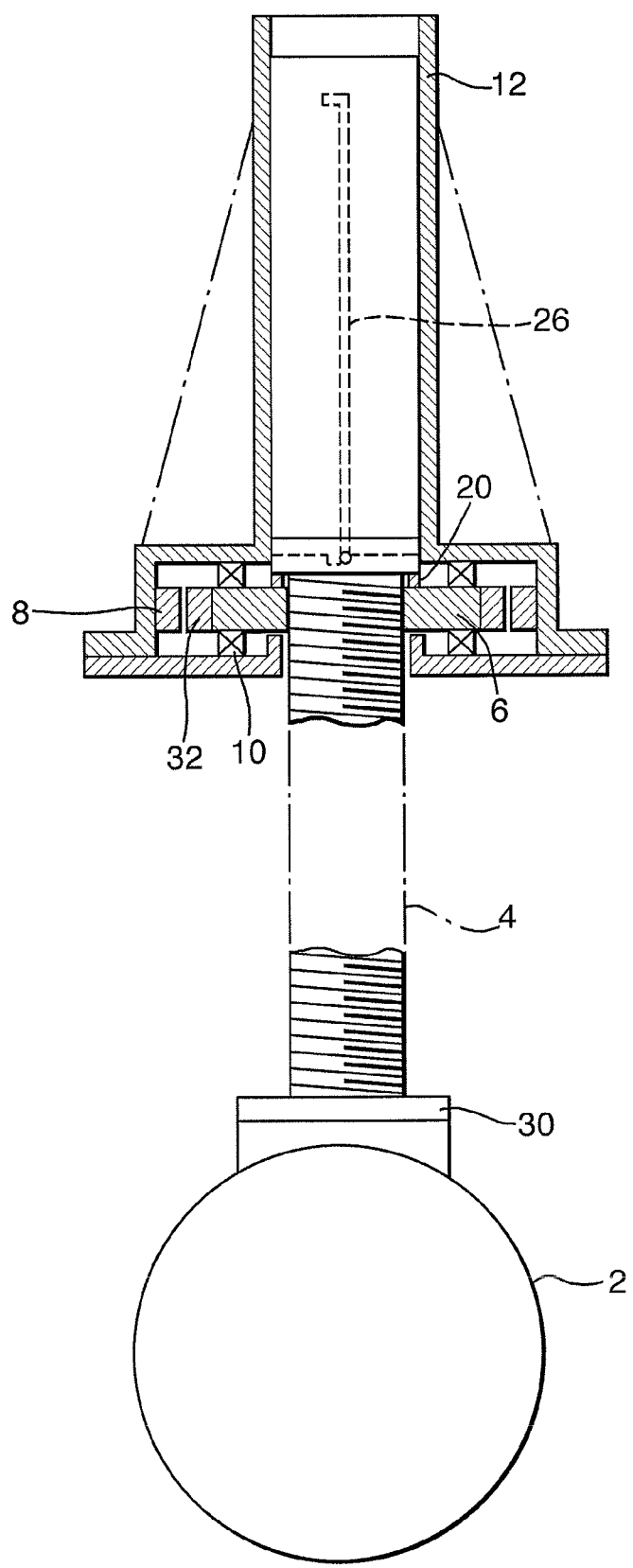
FIG. 3 depicts a linear actuator of a second embodiment in accordance with the invention.

In an alternative embodiment, as shown in FIG. 3, the sleeve 12 extends away from the propeller housing 2 relative to the actuating mechanism that includes components identified by numbers 8, 32, 10, 6, 20, etc., rather than towards the propeller housing, as in the first embodiment. The arrangement of the alternative embodiment operates in substantially the same manner as that of the first embodiment.

It will be appreciated that this embodiment has a smaller overall length than that of the first embodiment. Additionally, steering torque is reduced. Although not limited to electrical actuation, the invention is inherently compatible with it and can be used to eliminate a requirement for hydraulic systems. A single actuator is required which reduces the mechanical complexity of the unit and also requires fewer control connections that may be significant in certain applications, e.g., where power and control must pass through a boundary such as the pressure hull of a submarine, or the hull of a ship.

The arrangement offers greater angular steering range than some existing hydraulically actuated units. Combining 180 degree rotation with thrust reversal (for thrusters application) gives effective 360 degree thrust vectoring capability.

Additionally, the lift/lower and steering action may be faster than in conventional arrangements.

The invention could be used in an aerospace application in, for example a nose wheel retraction and steering system, or steerable main undercarriage application, with the addition of suitable safety features and uprated materials properties and a suspension system.

The invention could also be used in remote lock and release mechanism, e.g., for vehicle docking systems. The principle is the same as the primary application, whereby a locking probe extends into a mating locking plate, and is then rotated and operates on a stationary cam surface in the locking plate so as to pull two parts together and hold them firmly. Furthermore, it is relevant to any application requiring a reversible remotely operated 'push and then twist' or 'pull and then twist' action.

What is claimed is:

1. A linear actuator comprising:
a shaft having a thread;
a rotatable turning mechanism engaging the thread; and
an engaging means movable between a first position where rotation of the turning mechanism produces substantially linear displacement of the shaft, and a second position where rotation of the turning mechanism produces substantially rotary displacement of the shaft,
wherein the engaging means further comprises
a sleeve extending around the shaft and having a slot that extends parallel to the shaft, and having a limit stop outside the slot, and
a pin mounted to the shaft, and
wherein when the pin abuts against the limit stop, the engaging means prevents rotation of the shaft in a first direction and permits rotation of the shaft in the opposite direction.

2. A linear actuator according to claim 1, wherein the rotatable turning mechanism is connected to the sleeve through a thrust bearing.

3. A linear actuator according to claim 2, wherein the rotatable turning mechanism comprises a nut rotatable by a motor.

4. A linear actuator according to claim 3, wherein the motor is a rim driven motor and the nut is a rotor in the rim driven motor.

5. A linear actuator according to claim 1, wherein the pin and the slot form a lock device that has a first configuration where rotation of the turning mechanism produces substantially linear displacement of the shaft relative to the sleeve and a second configuration where rotation of the turning mechanism produces substantially rotary displacement of the shaft relative to the sleeve.

6. A linear actuator according to claim 5, wherein the lock device has a pin or roller that engages a slot in the first configuration.

7. A linear actuator according to claim 6, wherein the pin is fixed to and moves with the shaft in both the first and second configurations.

8. A linear actuator according to claim 5, wherein there is a predetermined friction between the turning mechanism and the thread and the lock device provides resistance between the sleeve and the shaft, the resistance provided by the lock device when in the first configuration being greater than the predetermined friction and the resistance provided by the lock device in the second configuration being less than the predetermined friction.

9. A linear actuator comprising:
a shaft having a thread;
a rotatable turning mechanism engaging the thread; and
an engaging means movable between a first position where rotation of the turning mechanism produces substantially linear displacement of the shaft, and a second position where rotation of the turning mechanism produces substantially rotary displacement of the shaft,
wherein the shaft further comprises a travel limiter, which limits the maximum linear displacement of the shaft,
wherein the rotatable turning mechanism comprises a nut rotatable by a motor,
wherein the motor is a rim driven motor and the nut is a rotor in the rim driven motor.

10. A linear actuator according to claim 9, wherein the nut has a plurality of circumferentially arranged magnets.

11. A linear actuator according to claim 9, wherein the rotatable turning mechanism is connected to a sleeve through a thrust bearing.

12. A linear actuator according to claim 11, the actuator having a lock device that has a first configuration where rotation of the turning mechanism produces substantially linear displacement of the shaft relative to the sleeve and a second configuration where rotation of the turning mechanism produces substantially rotary displacement of the shaft relative to the sleeve.

13. A linear actuator according to claim 12, wherein the lock device has a pin or roller that engages a slot in the first configuration.

14. A linear actuator according to claim 13, wherein the pin is fixed to and moves with the shaft in both the first and second configurations.

15. A linear actuator according to claim 12, wherein there is a predetermined friction between the turning mechanism and the thread and the lock device provides resistance between the sleeve and the shaft, the resistance provided by the lock device when in the first configuration being greater than the predetermined friction and the resistance provided by the lock device in the second configuration being less than the predetermined friction.

16. A linear actuator according to claim 9, wherein the shaft is hollow and contains cables to supply electrical power to the propulsion means.

17. A linear actuator comprising:
a shaft having a thread;
a rotatable turning mechanism engaging the thread; and
an engaging means movable between a first position where rotation of the turning mechanism produces substantially linear displacement of the shaft, and a second position where rotation of the turning mechanism produces substantially rotary displacement of the shaft,
wherein propulsion means are mounted to the shaft,
wherein the propulsion means is a rim driven azimuthing thruster.

18. A linear actuator according to claim 17, wherein the rotatable turning mechanism is connected to a sleeve through a thrust bearing.

19. A linear actuator according to claim 18, the actuator having a lock device that has a first configuration where rotation of the turning mechanism produces substantially linear displacement of the shaft relative to the sleeve and a second configuration where rotation of the turning mechanism produces substantially rotary displacement of the shaft relative to the sleeve.

20. A linear actuator according to claim 19, wherein the lock device has a pin or roller that engages a slot in the first configuration.

21. A linear actuator according to claim 20, wherein the pin is fixed to and moves with the shaft in both the first and second configurations.

22. A linear actuator according to claim 19, wherein there is a predetermined friction between the turning mechanism and the thread and the lock device provides resistance between the sleeve and the shaft, the resistance provided by the lock device when in the first configuration being greater than the predetermined friction and the resistance provided by the lock device in the second configuration being less than the predetermined friction.

23. A linear actuator according to claim 17, wherein the rotatable turning mechanism comprises a nut rotatable by a motor.

24. A linear actuator according to claim 23, wherein the motor is a rim driven motor and the nut is a rotor in the rim driven motor.

25. A linear actuator according to claim 17, wherein the shaft is hollow and contains cables to supply electrical power to the propulsion means.

\* \* \* \* \*